United States Patent Office 3,509,123
Patented Apr. 28, 1970

3,509,123
MONOAZO PIGMENTS
Armand Roueche, Neu Allschwil, Basel, Switzerland, assignor to Ciba Limited, Basel, Switzerland, a company of Switzerland
No Drawing. Filed Aug. 30, 1967, Ser. No. 664,267
Claims priority, application Switzerland, Sept. 6, 1966, 12,882/66
Int. Cl. C09b 29/32
U.S. Cl. 260—193                                        6 Claims

ABSTRACT OF THE DISCLOSURE

Monoazo dyestuffs of the formula

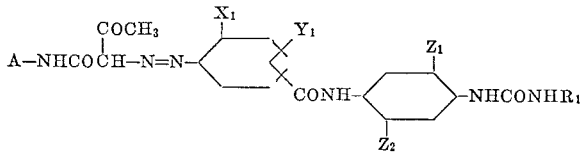

in which A is a naphthyl radical or a benzene radical which may be substituted by halogen atoms, lower alkyl or lower alkoxy groups, $X_1$ represents a halogen atom, a lower alkyl, lower alkoxy or carbo-lower alkoxy group, $Y_1$ is a hydrogen or halogen atom, $Z_1$ and $Z_2$ each represents a hydrogen or halogen atom, lower alkyl, trifluoromethyl or lower alkoxy group and $R_1$ is a hydrogen atom, a lower alkyl, a phenyl lower alkyl or a phenyl radical which may be substituted by halogen atoms, lower alkyl, trifluoromethyl or lower alkoxy groups, are valuable pigments which yield yellow dyings of excellent fastness properties, when incorporated in pastics and lacquers.

The present invention is based on the observation that valuable new monoazo dyestuff pigments of the formula (1)   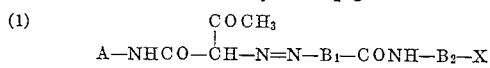

in which A represents an unsubstituted or substituted benzene (containing up to three substituents), naphthalene or benzthiazole residue, $B_1$ and $B_2$ each represents an unsubstituted or substituted benzene radical, and X a carboxylic acid arylide, aroylamino, ureido, alkylureido or arylureido group, can be obtained by condensing an azo dyestuff carboxylic acid halide of the formula (2)   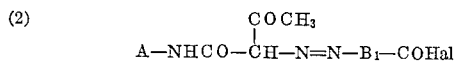

with a monoamine the formula (3)           $H_2N—B_2—X$

Since the dyestuffs of this invention are pigments, they must not contain groups imparting solubility in water, particularly sulphonic acid and carboxylic acid groups.

Especially valuable pigments can be obtained by condensing a carboxylic acid chloride of the formula (4)   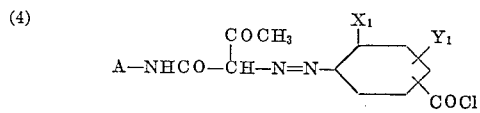

in which A has the above meaning, $X_1$ represents a halogen atom or an alkyl, alkoxy or carbalkoxy group and $Y_1$ a hydrogen or halogen atom, with a monoamine of the formula (5)   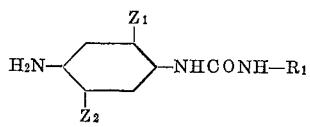

in which $R_1$ represents a hydrogen atom, an alkyl or aralkyl group or a benzene radical which may be substituted with up to two substituents, for example, by a halogen atom or an alkyl, trifluoromethyl, alkoxy, cyano, nitro, carbalkoxy, alkanoylamino or carbamide group, and $Z_1$ and $Z_2$ each represents a hydrogen or halogen atom or an alkyl, trifluoromethyl or alkoxy group.

The carboxylic acids from which the acid halides are derived may be obtained by coupling a diazo compound of an aminobenzoic acid, especially one of the formula (6)   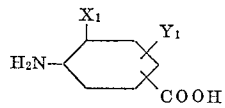

with an acetoacetyl compound of the formula (7)   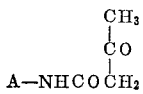

in which $X_1$, $Y_1$ and A have the above meanings. As examples of aminobenzoic acids of the Formula 6 the following may be mentioned: 3-amino-4-chlorobenzoic acid, 3-amino-4-methylbenzoic acid, 3-amino-4-methoxybenzoic acid, 3-amino-4,6-dichlorobenzoic acid, 3-amino-4-methoxy-6-chlorobenzoic acid, 3 - amino - 4 - carbomethoxybenzoic acid, 3-amino-4-carbethoxybenzoic acid and 4-amino-3-methylbenzoic acid.

The compounds of Formula 7 may be obtained simply by reacting a diketene or acetoacetic ester with an aromatic monoamine, for example: 2,5-dimethoxy-4-chloroaniline, 2,5-dimethoxy-4-bromoaniline, 2,5-diethoxy-4-chloroaniline, 2,5-diethoxy-4-bromoaniline, 2,4-dimethylaniline, 2-chloroaniline, 2-methoxyaniline, 2-methoxy-4-benzoylamino-5-chloroaniline, α-naphthylamine or 6-ethoxy-2-aminobenzthiazole.

The azo dyestuff monocarboxylic acids can be treated with agents capable of converting carboxylic acids into their acid halides, for example the bromides or chlorides, for example with phosphorus trichloride, pentachloride or oxychloride, or preferably with thionyl chloride. The treatment with such acid-halogenating agents is advantageously carried out in an inert organic solvent, for example a chlorobenzene, for example mono- or dichlorobenzene, toluene, xylene, benzene or nitrobenzene. When thionyl chloride is used as acid-chlorinating agent, it is advantageous to work in the presence of a dialkylformamide, especially dimethylformamide.

In the manufacture of the carboxylic acid halides it is generally advantageous first to dry the azo compounds prepared in an aqueous medium or to free them from water by azeotropic distillation in an organic solvent. If desired, the azeotropic drying may be carried out immediately before the treatment with the acid-halogenating agent.

The carboxylic acid halides obtained in this manner may be reacted with monoamines, especially those of the Formula 5.

As examples of monoamines the following may be mentioned:

(a) AMINES CONTAINING A UREA GROUP 4-aminodiphenylurea,
4-amino-4'-methyldiphenylurea,
4-amino-4'-methoxydiphenylurea,
4-amino-4'-chlorodiphenylurea,
4-amino-2,5-dimethyldiphenylurea,
4-amino-2,5-dimethyl-4'-chlorodiphenylurea,
4-amino-2,5-dichlorodiphenylurea,
4-amino-2,5,4'-trichlorodiphenylurea,
4-amino-2-methyl-5-chlorodiphenylurea,
4-amino-2-methoxy-5-chlorodiphenylurea,
4-amino-2-methoxy-5,4'-dichlorodiphenylurea,
4-amino-2,5-dichloro-4'-methoxydiphenylurea,
4-amino-2,4'-dichlorodiphenylurea,
4-amino-2-chloro-3'-trifluoromethyldiphenylurea,
4-amino-2,5-dimethylphenyl-α-naphthylurea,
4-aminophenyl-α-naphthylurea,
4-amino-2,5-dimethyl-4'-methoxydiphenylurea,
4-amino-5-methoxy-2-chlorodiphenylurea,
4-amino-2'-chloro-5'-trifluoromethyldiphenylurea,
4-amino-2'-chloro-5'-carbomethoxydiphenylurea,
4-amino-2',4'-dichlorodiphenylurea,
4-amino-4'-methoxydiphenylurea,
4-amino-4'-acetylaminodiphenylurea,
4-amino-4-carbomethoxydiphenylurea,
4-amino-2,5-dimethylphenylbenzylurea,
4-amino-2,5-dimethyl-4'-acetylaminodiphenylurea,
4-aminophenylmethylurea,
4-amino-2,5-dimethylphenylmethylurea,
4-amino-2,5-dichlorophenylmethylurea,
4-amino-2,5-dichlorophenylurea,
4-amino-2,5-dimethylphenylurea and 4-aminophenylurea.

(b) BENZOYLAMINOANILINES 2,5-dichloro-4-benzoylaminoaniline,
2,5-dichloro-4-(4'-chlorobenzoylamino)-aniline,
2,5-dichloro-4-(2',4'-dichlorobenzoylamino)-aniline,
2,5-dichloro-4-(4'-methylbenzoylamino)-aniline,
2,5-dichloro-4-(4'-phenylbenzoylamino)-aniline,
2,5-dimethyl-4-benzoylamino-aniline,
2,5-dimethyl-4-(4'-chlorobenzoylamino)-aniline,
2,5-dimethyl-4-(4'-methylbenzoylamino)-aniline,
2,5-dimethyl-4-(4'-phenylbenzoylamino)-aniline,
2,5-dimethyl-4-(4'-methoxybenzoylamino)-aniline,
2-methoxy-5-chloro-4-benzoylamino-aniline,
2-methoxy-5-chloro-4-(4'-chlorobenzoylamino)-aniline,
2-chloro-5-methoxy-4-(4'-chlorobenzoylamino)-aniline and
2-chloro-5-methoxy-4-(4'-phenylbenzoylamino)-aniline.

(c) AMINOBENZOIC ACID ARYLAMIDES 4-aminobenzoic acid phenylamide,
4-aminobenzoic acid-4'-chlorophenylamide,
4-aminobenzoic acid-2',4'-dichlorophenylamide,
4-aminobenzoic acid-2'-chloro-5'-trifluoromethylphenylamide,
4-amino-3-methylbenzoic acid-3'-trifluoromethylphenylamide,
4-amino-3-methylbenzoic acid-4'-chlorophenylamide,
4-chloro-3-aminobenzoic acid phenylamide,
4-chloro-3-aminobenzoic acid-2',4'-dichlorophenylamide,
4-chloro-3-aminobenzoic acid-2',5'-dichlorophenylamide,
4-methyl-3-aminobenzoic acid phenylamide and
4-methoxy-3-aminobenzoic acid-4'-chlorophenylamide.

The condensation of the carboxylic acid halides of the kind defined above with the amine is advantageously carried out in an anhydrous medium; when this is done, it generally proceeds surprisingly easily even at temperatures within the boiling range of the common organic solvents for example toluene, monochlorobenzene, dichlorobenzene, trichlorobenzene, nitrobenzene or the like. To accelerate the reaction it is in general advisable to add an acid acceptor, for example anhydrous sodium acetate or pyridine.

Some of the resulting dyestuffs are crystalline and others are amorphous and in most cases they are obtained in very good yields and in a pure state. It is advantageous first to isolate the acid chlorides obtained from the carboxylic acids, though in some cases this can be omitted without harmful effects, and the condensation carried out immediately after the manufacture of the carboxylic acid chlorides.

The new dyestuffs are valuable yellow pigments suitable for a wide variety of pigment applications, for example in a finely disperse form for dyeing rayon and viscose or cellulose ethers and esters or polyamides, polyurethanes or polyesters in the spinning mass. They may also be used for the manufacture of coloured lacquers or lakes, solutions and products from acetylcellulose, nitrocellulose, natural resins or synthetic resins, for example polymerization resins or condensation resins, for example aminoplasts, alkyd resins, phenoplasts, polyolefines for example polystyrene, polyvinylchloride, polyethylene, polypropylene, polyacrylonitrile, rubber, casein, silicone and silicone resins. Moreover, they can be used with advantage in the manufacture of coloured pencils, cosmetics or laminated panels.

In contrast with the nearest comparable dyestuffs of German specification No. 1,213,553 the pigments of this invention are distinguished by their better fastness to light.

Unless otherwise indicated, parts and percentages in the following examples are by weight.

Example 1

7.7 parts of the dyestuff obtained from 1 mol of diazotized 3 - amino - 4 - chlorobenzoic acid and 1 mol of 2,5 - dimethoxy - 4 - chloro - 1 - acetoacetylaminobenzene of the formula

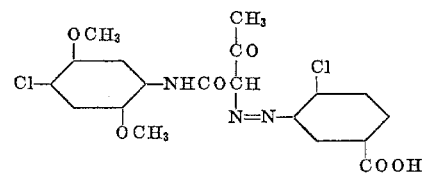

are stirred in 460 parts of ortho-dichlorobenzene together with 0.5 part of dimethylformamide and heated to 75–90° C. At this temperature 2.85 parts of thionyl chloride are added within 5 minutes and the whole is stirred for 2 hours at 120–130° C. The end of the reaction is recognized by the cessation of the evolution of hydrochloric acid and a specimen of the batch showing uniform yellow needles under a microscope. The batch is allowed to cool to 30° C. and suction filtered. The filter residue is washed with 200 parts of benzene, then with 150 parts of petroleum ether and dried under vacuum at 50 to 60° C. to yield 7.1 parts of the dyestuff acid chloride as a yellow, crystalline powder.

4.75 parts of the acid chloride thus obtained are stirred in 100 parts of ortho-dichlorobenzene with 0.2 part of thionyl chloride and heated to 80 to 85° C. A warm solution of 3.0 parts of 4-amino-2',4'-dichlorodiphenylurea in 460 parts of orthodichlorobenzene is then added and the whole is heated for 12 hours at 140–145° C. The pigment formed is then suction filtered while hot and washed with hot ortho-dichlorobenzene until the filtrate runs colourless. The dichlorobenzene is then displaced with cold methanol and the product is thoroughly washed with hot water and dried at 60–90° C. to yield 6.1 parts of a soft powder which is substantially insoluble in the common solvents. When rolled into polyvinylchloride, it produces vivid yellow shades having good fastness to migration and light. The pigment corresponds to the formula

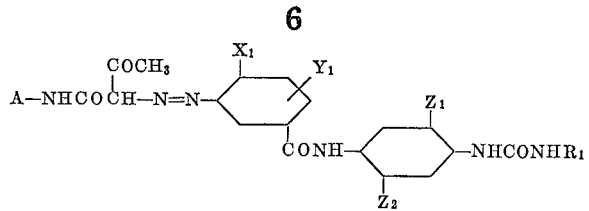

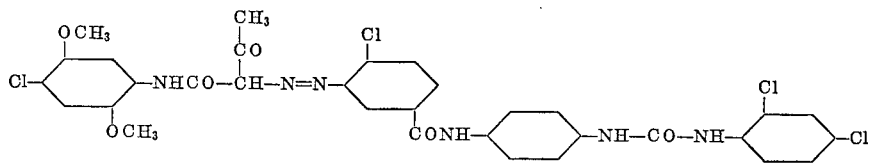

The following table lists further components from which monoazo pigments can be obtained by the process described above by coupling 1 mol of a diazo compound of the aminocarboxylic acid in Column I with 1 mol of the acetoacetyl compound of the amine listed in Column II, converting the resulting monoazo dyestuff carboxylic acid into its acid chloride and condensing the latter with 1 mol of the amine shown in Column III. Column IV shows the shade produced with the resulting pigment in a polyvinylchloride foil.

wherein A is selected from the group consisting of naphthyl, phenyl and substituted phenyl containing up to three substituents, wherein the substituents are selected from the group consisting of chloro, bromo, lower alkyl and lower alkoxy; $X_1$ is selected from the group consisting of chloro, lower alkyl, lower alkoxy and carb-lower alkoxy; $Y_1$ is selected from the group consisting of hydro-

| | I | II | III | IV |
|---|---|---|---|---|
| 1 | 3-amino-4-chloro-benzoic acid | 2,5-dimethoxy-4-chloroaniline | 4-amino-2-methoxy-5,4'-dichlorodiphenylurea | Reddish yellow. |
| 2 | do | do | 4-amino-2,4'-dichlorodiphenylurea | Do. |
| 3 | do | do | 4-amino-2,5-dichlorodiphenylurea | Yellow. |
| 4 | do | do | 4-aminodiphenylurea | Do. |
| 5 | do | do | 4-amino-2,5-dimethyldiphenylurea | Do. |
| 6 | do | do | 4-amino-2,5-dimethyl-4'-chlorodiphenylurea | Do. |
| 7 | do | do | 4-amino-2-methoxy-5-chloridiphenylurea | Greenish yellow. |
| 8 | do | do | 4-aminophenylmethylurea | Do. |
| 9 | do | do | 4-amino-4'-methoxydiphenylurea | Reddish yellow. |
| 10 | do | do | 4-amino-2,5-dimethylphenylbenzylurea | Greenish yellow. |
| 11 | do | do | 4-amino-2',4'-dichlorodiphenylurea | Yellow. |
| 12 | do | do | 4-amino-2,5-dichlorlphenylmethylurea | Do. |
| 13 | do | do | 4-amino-2'-chloro-5'-trifluoromethyldiphenylurea | Reddish yellow. |
| 14 | do | do | 3-amino-4-methyl-2',5'-dichlorodiphenylurea | Yellow. |
| 15 | do | 2,5-dimethoxy-4-bromoaniline | 4-amino-2,5-dichlorophenylurea | Do. |
| 16 | do | do | 4-amino-2,5-dichlorodiphenylurea | Do. |
| 17 | do | do | 4-amino-2,5-dimethyldiphenylurea | Do. |
| 18 | do | do | 4-amino-2',4'-dichlorodiphenylurea | Greenish yellow. |
| 19 | do | do | 4-amino-4'-chlorodiphenylurea | Reddish yellow. |
| 20 | do | do | 4-amino-2-methoxy-5-chloro-(4'-acetylamino)-benzoylaminobenzene. | Yellow. |
| 21 | do | do | 4-amino-2,5-diethoxydiphenylurea | Do. |
| 22 | 3-amino-4,6-dichlorobenzoic acid | 2,5-dimethoxy-4-chloroaniline | 4-amino-2,5-dimethyl-4'-chlorodiphenylurea | Do. |
| 23 | do | do | 4-amino-2,5-dichlorodiphenylurea | Reddish yellow. |
| 24 | do | do | 4-amino-2-methoxy-5-chloridiphenylurea | Yellow. |
| 25 | do | do | 4-amino-2',4'-dichlorodiphenylurea | Do. |
| 26 | do | do | 4-amino-4'-acetylaminodiphenylurea | Greenish yellow. |
| 27 | 3-amino-4-chlorobenzoic acid | 2-methoxyaniline | 4-amino-4'-chlorodiphenylurea | Yellow. |
| 28 | 3-amino-4,6-dichlorobenzoic acid | 2,5-dimethoxy-4-chloroaniline | 4-amino-2-methoxy-5-chloro-(2',4'-dichloro)-benzoylaminobenzene. | Do. |
| 29 | do | do | 4-amino-2,5,3'-trichlorodiphenylurea | Reddish yellow. |
| 30 | 3-amino-4-methylbenzoic acid | do | 4-amino-2'-4'-dichlorodiphenylurea | Greenish yellow. |
| 31 | do | do | 4-amino-2,5-dimethyldiphenylurea | Do. |
| 32 | do | do | 4-amino-2,5-dichlorodiphenylurea | Do. |
| 33 | do | do | 4-amino-2,5-dimethyl-4'-chlorodiphenylurea | Do. |
| 34 | do | do | 4-amino-2-methoxy-5-chloro-1-benzoylaminobenzene | Do. |
| 35 | do | do | 4-amino-2-methoxy-5-chloridiphenylurea | Very greenish yellow. |
| 36 | do | do | 4-amino-2-ethoxy-5-chlorodiphenylurea | Do. |
| 37 | 3-amino-4-chlorobenzoic acid | α-Naphthylamine | 4-amino-2-chloro-5-methoxydiphenylurea | Reddish yellow |
| 38 | do | do | 4-amino-2,5-dimethyl-diphenylurea | Yellow. |
| 39 | do | do | 4-amino-4'-chlorodiphenylurea | Do. |
| 40 | do | do | 4-amino-2,5-dichlorodiphenylurea | Do. |

Example 2

65 parts of stabilized polyvinylchloride, 35 parts of dioctyl phthalate and 0.2 part of the dyestuff obtained according to Example 1 are stirred together and then rolled to and fro on a two-roll calender for 7 minutes at 140° C. The resulting greenish yellow foil has very good fastness to light and migration.

I claim:
1. A monoazo dyestuff pigment of the formula gen and chloro; Z and $Z_1$ are each selected from the group consisting of hydrogen, chloro, lower alkyl, trifluoromethyl and lower alkoxy; and $R_1$ is selected from the group consisting of hydrogen, lower alkyl, phenyl, phenyl lower alkyl and substituted phenyl containing up to two substituents, wherein the substituents are selected from the group consisting of chloro, lower alkyl, trifluoromethyl and lower alkoxy.

2. The dyestuff as claimed in claim 1 of the formula
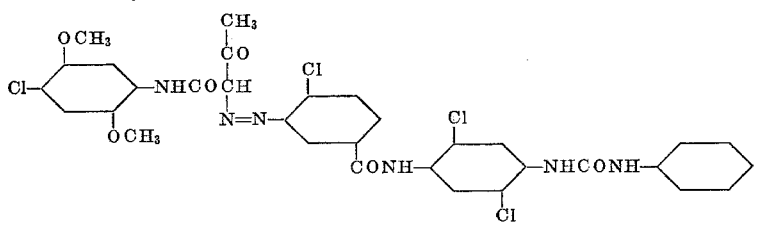
3. The dyestuff as claimed in claim 1 of the formula
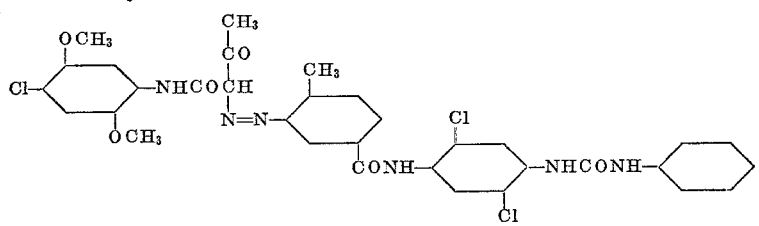
4. The dyestuff as claimed in claim 1 of the formula
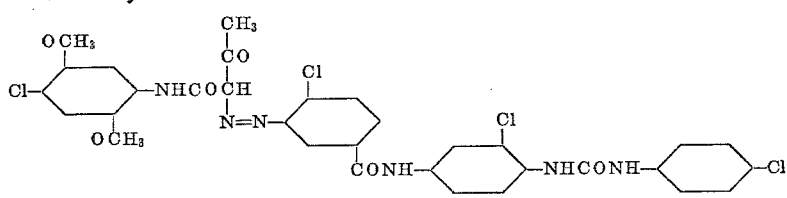
5. The dyestuff as claimed in claim 1 of the formula
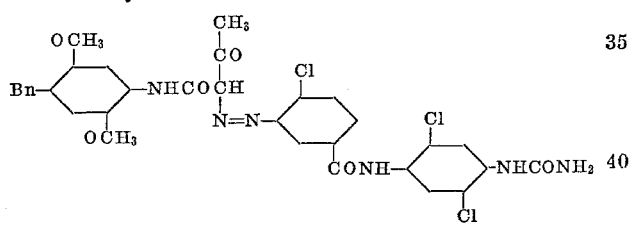
6. The dyestuff as claimed in claim 1 of the formula
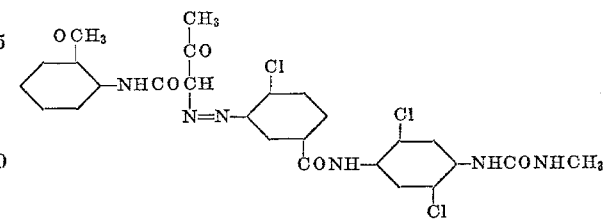
References Cited
FOREIGN PATENTS
1,213,553   3/1966   Germany.
CHARLES B. PARKER, Primary Examiner
C. F. WARREN, Assistant Examiner
U.S. Cl. X.R.
8—4, 5, 41, 50; 106—23